T. HOPPER.
Car Brake.
No. 20,429.
Patented June 1, 1858.
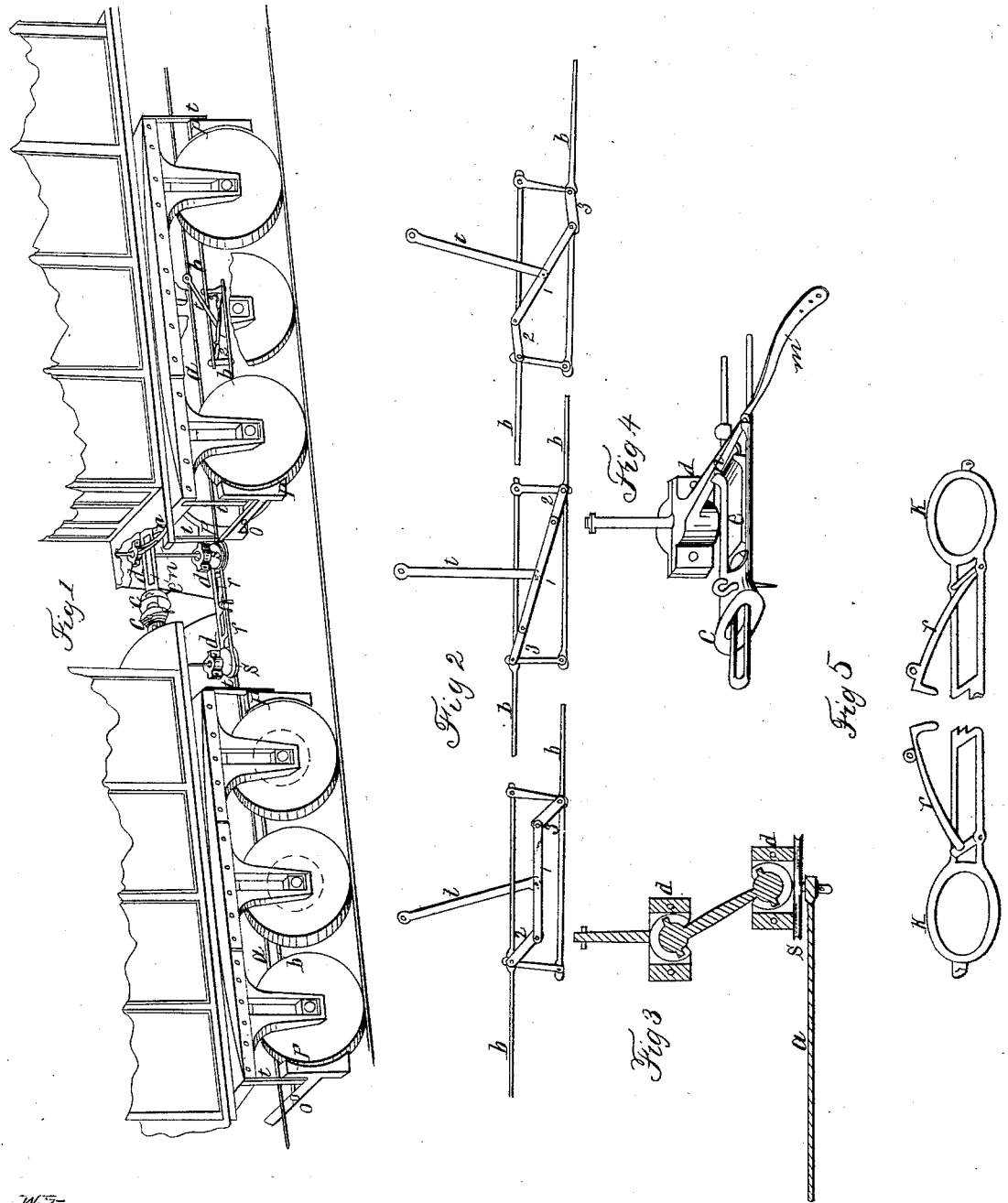

UNITED STATES PATENT OFFICE.

T. HOPPER, OF NEWARK, NEW JERSEY.

RAILROAD-CAR BRAKE.

Specification of Letters Patent No. 20,429, dated June 1, 1858.

*To all whom it may concern:*

Be it known that I, THOMAS HOPPER, of the city of Newark, in the county of Essex and State of New Jersey, have invented a new and Improved Mode for Connecting Railroad-Car Brakes; and I do hereby declare that the following is a full and exact description and operation of the same, reference being had to the annexed drawings, making a part of this specification, in which—

Figure 1 is a perspective view. Letter $n$ is a lever connected with the journal and secured under the platform of each car by a journal box fitted to receive the journal. Lever $n$, connected to joint box $d$, is placed at right angles with the arms of the bumper $c$. Letter $e$ are sliding bars placed between the arms of the bumper, and extending from the face of lever $n$ to the coupling link. Lever $n$ rests against the sliding bar $e$ by means of a spring $m$. The operation is to hold the sliding bar $e$ against the coupling link. As the cars separate or close together lever $n$ acts in connection by the link and bumper. Letter $d$ is a joint box connected under lever $n$ and fitted to receive a shaft by means of a universal joint. Box $d$, attached to eccentric wheel S, is fitted same as box $d$, lever $n$. The connection makes two universal joints on the same shaft. The connecting pin or eccentric wheel S is directly on a line with the journal under the platform. Eccentric wheel S operates in conjunction by lever $n$ from the sliding bar $e$ and bumper $c$. The radius of eccentric wheel S and lever $n$ is equal from the center of sliding bar $e$. Eccentric wheels S S are grooved to receive the connecting bands fitted to the periphery of each wheel and extending forward to receive connection of the next car by means of hooks $r$ $r$ as shown in Fig. 5. The brake rods $b$, $b$, pass longitudinally by each other, and are connected together by links or arms made to move with freedom in their bearings in a direct line with the brake rods $b$, $b$, as shown in Fig. 2, and are connected by reversible fulcrums 1, 2, 3, which extend transversely from arm to arm connecting brake rods $b$, $b$, and operated on by lever $t$, attached to fulcrum 1, levers $t$, $t$, connected to the main rod $a$.

It is immaterial which end of the train the power is applied; the main rod $a$, connected with the eccentric pin of each car and secured together by the hooks $r$, $r$. It extends in a direct line from the rear car to the engine, and by two joint connections on each shaft the plane of eccentric wheels S, S, operate in accordance with the main rod $a$, although the lower end of the connecting shaft is thrown from a vertical to an angle of twenty degrees or more as shown in Fig. 3, by which means the brakes of each car being connected the levers self acting by means of the link and bumpers, the eccentric wheels S, S, are moved by the action of the lever $n$ in conjunction.

The operation is to equalize space between each car, whereby in danger of a collision or any obstruction on the track the brakes are easily applied with steam at any position of the train of cars.

What I claim and desire to secure by Letters Patent is—

1. Lever, $n$, sliding bar, $e$, eccentric wheel, S, connected with lever, $n$, by means of a shaft and two universal joints, operated upon as herein specified.

2. I also claim brake rods $b$, $b$, connected from $b$ to $b$, by reversible fulcra transversely, lever, $t$, attached to fulcrum, 1, and operated by means of the main rod, $a$, substantially as set forth.

THOMAS HOPPER.

Witnesses:
HATFIELD HOPPER,
LEWIS L. CARLISLE.